(No Model.) 2 Sheets—Sheet 1.

A. RONCAGLIA.
CABLE BRAKE.

No. 339,697. Patented Apr. 13, 1886.

WITNESSES:
Isham R. Howze
[signature]

INVENTOR
Augustine Roncaglia
BY O'Brien & Co
his ATTORNEYS (No Model.) 2 Sheets—Sheet 2.
A. RONCAGLIA.
CABLE BRAKE.
No. 339,697. Patented Apr. 13, 1886.
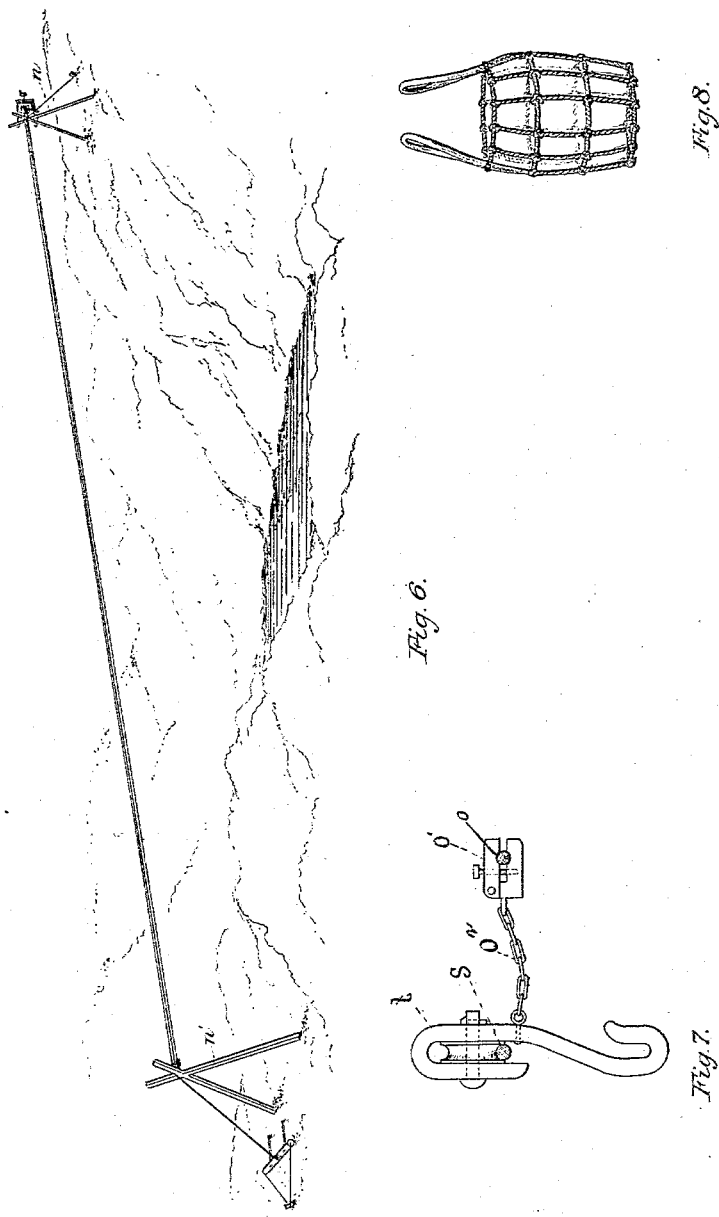
WITNESSES:
INVENTOR
Augustine Roncaglia
BY O'Brien & Co
his ATTORNEYS

UNITED STATES PATENT OFFICE.

AUGUSTINE RONCAGLIA, OF DENVER, COLORADO.

CABLE-BRAKE.

SPECIFICATION forming part of Letters Patent No. 339,697, dated April 13, 1886.

Application filed December 14, 1885. Serial No. 185,597. (No model.)

*To all whom it may concern:*

Be it known that I, AUGUSTINE RONCAGLIA, a citizen of the United States, residing at Denver, in the county of Arapahoe and State of Colorado, have invented a new and useful Improvement in Cable-Brakes, of which the following is a specification, reference being had therein to the accompanying drawings, in which similar letters refer to corresponding parts.

The object of my improvement is to provide a cable-brake for use wherever such a brake is required, and particularly for use in connection with my improved device for transferring loads down mountains, for which Letters Patent of the United States have been granted to me, said Letters Patent bearing date November 17, A. D. 1885, and numbered 330,805, as hereinafter more fully described.

Figure 1:
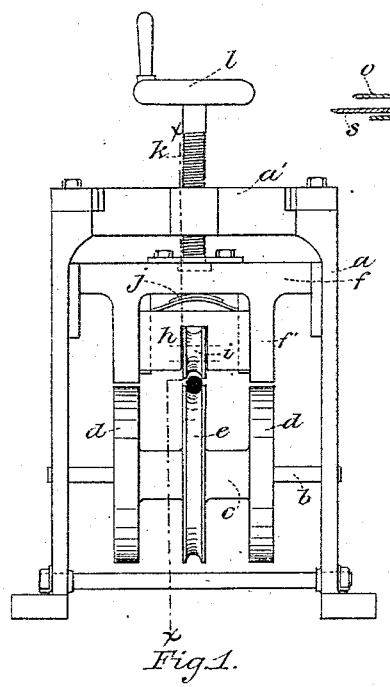
Figure 5:
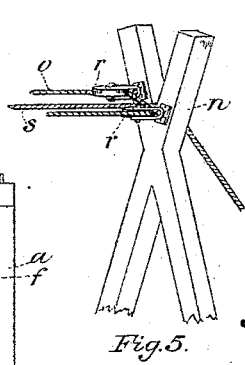
Figure 2:
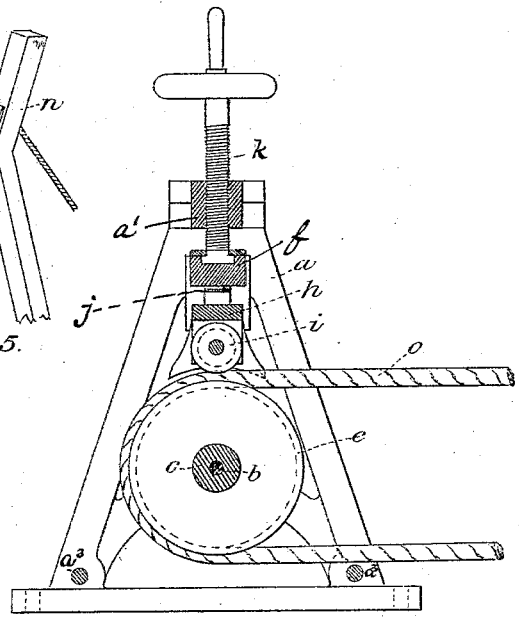
Figure 4:
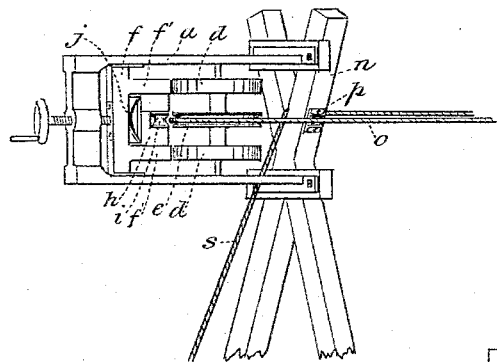
Figure 3:
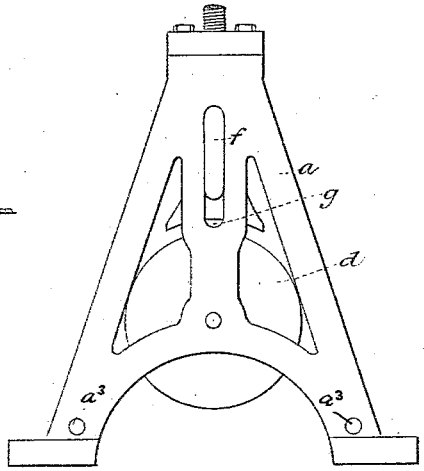

In the drawings, Figure 1 is a top view of my improved cable-brake. Fig. 2 is a longitudinal section of the same, taken on line $xx$, Fig. 1. Fig. 3 is a side elevation of my improved brake, showing a modification of the frame shown in Fig. 2. Fig. 4 shows my improved brake attached to one of the supports forming a part of my improved device for transferring loads down mountains, hereinbefore mentioned. Fig. 5 shows two pulleys attached to the cable-support opposite that shown in Fig. 4, also the cable upon which my improved brake acts, together with the main transfer-cable forming a part of my formerly-patented device, as aforesaid. Fig. 6 shows my improved brake used in connection with my aforesaid patented device. Fig. 7 shows the means of attaching the brake-cable to the hook or other device which supports the load, said device resting upon the main transfer-cable. Fig. 8 shows a rope-bucket, within which a sack or other material may be placed preparatory to its transfer down the mountain or slope.

In the drawings, $a$ is a frame, within which is journaled the shaft $b$, which passes through the hollow shaft $c$, provided with three pulleys, $d\,d$ and $e$, said pulleys being made fast to said shaft $c$, which is fastened to shaft $b$ and made stationary thereon. Shaft $b$ turns easily within its journals. Pulley $e$ is fashioned for the reception of a cable, as shown, while the corresponding surfaces of pulley $d\,d$ are smooth.

$f$ is a sliding block, the extremities of which move easily within slots $g$ of frame $a$. Sliding block $f$ contains hangers $f'\,f'$, which are concave upon their under surface, so as to bear equally upon the convex surface of pulleys $d\,d$, directly beneath said hangers.

Within sliding block $f$, and between hangers $f'\,f'$, is the small movable block, $h$, containing the small pulley $i$, the same being journaled within said block $h$. Movable block $h$ contains small slots within it extremities. Said slots are fashioned to receive corresponding projections on the inner surface of hangers $f'\,f'$.

Directly above movable block $h$, and riveted to sliding block $f$, is the spring $j$.

$k$ is a screw-shaft, to the outer extremity of which is attached the crank-wheel $l$. The threaded portion of screw-shaft $k$ passes through the top cross-bar, $a'$, of the frame. Cross-bar $a'$ is threaded for the reception of screw-shaft $k$. The inner extremity of screw-shaft $k$ is journaled within the top of sliding block $f$. As screw-shaft $k$ moves through cross-bar $a'$ sliding block $f$ travels back and forth with said shaft.

$a^3\,a^3$ are bottom cross-bars of frame $a$, being used to strengthen the frame.

When used in connection with my improved device for transferring loads down mountains, the operation of my improved cable-brake is as follows: The brake is attached to support $n$, occupying the more elevated position on the mountain slope, as shown in Fig. 6, said brake being preferably bolted to support $n$ in the manner and position shown in Figs. 4 and 6. Upon pulley $e$ is placed an endless cable, $o$, said cable $o$ passing over a small pulley, $p$, Fig. 4, placed on each side of support $n$, only one of said pulleys $p$ being shown in the drawings. Cable $o$ also passes over two small pulleys, $r\,r$, attached to opposite support, $n'$, as shown in Figs. 5 and 6. Cable $o$ runs in close proximity to cable $s$, so that when the load moves along cable $s$ upon a supporting-hook, $t$, said hook may be attached to cable $o$ by means of a clasp, $o'$, and chain $o^2$, as shown in Fig. 7. In attaching cable $o$ to hook $t$ any other suitable means may be used. The brake is applied by turning crank-wheel $l$, so as to bring hangers $f'\,f'$ in contact with pulleys $d\,d$, and at the same time increase the friction of cable $o$ upon pulley $e$ by bringing small pulley $i$ in contact with cable $o$ from above, as shown. Spring $j$ allows hangers $f'$ to descend or move forward after movable block $h$ can move downward or forward no farther by reason of pulley $i$ coming in contact with pulley $e$. By this means the velocity of cable $o$ is controlled, thereby regulating the movement of hook $t$ upon transfer-cable $s$ by reason of cable $o$ being attached to hook $t$, as before described. Cable $o$ may also be utilized for carrying light loads up the mountain, while its action is continued by the descending load passing along the transfer-cable $s$.

What I claim as my invention, and desire to secure by Letters Patent, is—

1. In a cable-brake, the combination of a suitable frame, $a$, shaft $b$, hollow shaft $c$, provided with pulleys $d\,d$ and $e$, sliding block $f$, provided with hangers $f'\,f'$, movable block $h$, pulley $i$, spring $j$, screw-shaft $k$, and crank-wheel $l$, substantially as described.

2. In a cable-brake, the combination of a suitable frame, $a$, shaft $b$, provided with pulleys $d\,d$ and $e$, sliding block $f$, provided with hangers $f'\,f'$, movable block $h$, pulley $i$, spring $j$, screw-shaft $k$, crank-wheel $l$, an endless cable, $o$, and suitable means of attaching cable $o$ to a hook or other device supported upon a transfer-cable, substantially as shown and described.

AUGUSTINE RONCAGLIA.

In presence of—
  SAM. MILTON,
  G. W. ALLEN.